United States Patent
In

(10) Patent No.: US 9,418,539 B2
(45) Date of Patent: Aug. 16, 2016

(54) REMOTE CONTROL APPARATUS AND ELECTRONIC DEVICE REMOTELY CONTROLLED BY THE SAME

(75) Inventor: Jeong-sik In, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 445 days.

(21) Appl. No.: 13/279,695

(22) Filed: Oct. 24, 2011

(65) Prior Publication Data

US 2012/0188113 A1 Jul. 26, 2012

(30) Foreign Application Priority Data

Jan. 26, 2011 (KR) .................. 10-2011-0007881

(51) Int. Cl.
*G08C 17/02* (2006.01)
*H04N 5/44* (2011.01)
*H04N 21/414* (2011.01)
*H04N 21/422* (2011.01)

(52) U.S. Cl.
CPC .............. *G08C 17/02* (2013.01); *H04N 5/4403* (2013.01); *H04N 21/41407* (2013.01); *H04N 21/4222* (2013.01); *H04N 21/42207* (2013.01); *H04N 21/42209* (2013.01); *H04N 21/42224* (2013.01)

(58) Field of Classification Search
CPC ................................ G08C 17/02; G08C 19/28
USPC ..................... 340/5.2, 176, 9.1; 341/176, 173
See application file for complete search history.

(56) References Cited

U.S. PATENT DOCUMENTS

| | | | | |
|---|---|---|---|---|
| 3,603,933 A | * | 9/1971 | Biedermann ................ | 370/442 |
| 3,618,031 A | * | 11/1971 | Kennedy et al. ............. | 710/63 |
| 3,631,398 A | * | 12/1971 | Houghton .................... | 367/199 |
| 3,811,112 A | * | 5/1974 | Hoven et al. ............... | 340/12.17 |
| 3,974,451 A | * | 8/1976 | Maeder ........................ | 455/353 |
| 4,105,966 A | * | 8/1978 | Lennon et al. .............. | 324/113 |
| 4,177,453 A | | 12/1979 | Collins | |
| 4,231,031 A | * | 10/1980 | Crowther et al. ........... | 340/12.16 |
| 4,377,006 A | * | 3/1983 | Collins et al. ............... | 398/106 |
| 4,667,193 A | * | 5/1987 | Cotie et al. .................. | 340/10.32 |
| 4,773,001 A | * | 9/1988 | Blair et al. ................... | 709/245 |
| 4,881,148 A | * | 11/1989 | Lambropoulos et al. ..... | 361/172 |
| 5,109,221 A | | 4/1992 | Lambropoulos et al. | |
| 5,182,551 A | * | 1/1993 | Goto ............................ | 340/4.37 |
| 5,191,610 A | * | 3/1993 | Hill et al. ..................... | 380/262 |
| 5,898,386 A | * | 4/1999 | Kaihatsu ..................... | 340/12.29 |

(Continued)

FOREIGN PATENT DOCUMENTS

CN 101857008 A 10/2010
DE 2634261 A1 2/1977

OTHER PUBLICATIONS

Communication issued on Sep. 2, 2015 by The State Intellectual Property Office in PR China in related Application No. 201210021377.6

*Primary Examiner* — Fekadeselassie Girma
(74) *Attorney, Agent, or Firm* — Sughrue Mion, PLLC

(57) ABSTRACT

A remote control apparatus including: a storage unit for storing message set information constituting information about one or more message sets each including one or more messages including different control requests; a control unit for generating binary code data each corresponding to the one or more messages each corresponding to the different control requests; and a communication interface unit for transmitting the binary code data to a controlled apparatus, wherein transmitted and received data amounts are minimized.

16 Claims, 8 Drawing Sheets

(56) References Cited

U.S. PATENT DOCUMENTS

| | | | | |
|---|---|---|---|---|
| 5,954,829 | A * | 9/1999 | McLain et al. | 714/712 |
| 6,044,438 | A * | 3/2000 | Olnowich | 711/130 |
| 6,049,835 | A * | 4/2000 | Gagnon | 709/245 |
| 6,097,383 | A * | 8/2000 | Gaughan et al. | 715/717 |
| 6,181,326 | B1 * | 1/2001 | Takahashi | 345/158 |
| 6,272,108 | B1 * | 8/2001 | Chapman | 370/226 |
| 7,259,696 | B1 * | 8/2007 | Lee et al. | 341/23 |
| 7,432,990 | B2 * | 10/2008 | Borden et al. | 348/734 |
| 8,292,721 | B1 * | 10/2012 | Watanabe | 463/17 |
| 2002/0106967 | A1 * | 8/2002 | Weiss et al. | 446/454 |
| 2002/0163905 | A1 * | 11/2002 | Brabrand | 370/347 |
| 2003/0005462 | A1 * | 1/2003 | Broadus et al. | 725/110 |
| 2004/0076153 | A1 * | 4/2004 | Hallenbeck | 370/389 |
| 2004/0080428 | A1 * | 4/2004 | Rye et al. | 340/825.69 |
| 2005/0135465 | A1 * | 6/2005 | Andrus | H04L 1/0043 375/220 |
| 2005/0185102 | A1 * | 8/2005 | Fairhurst | 348/734 |
| 2005/0235332 | A1 * | 10/2005 | Manson et al. | 725/110 |
| 2006/0145911 | A1 * | 7/2006 | Kim | 341/176 |
| 2007/0036094 | A1 * | 2/2007 | Kim | 370/277 |
| 2008/0049606 | A1 * | 2/2008 | Rhelimi et al. | 370/212 |
| 2008/0075471 | A1 * | 3/2008 | Flachs et al. | 398/202 |
| 2008/0174467 | A1 * | 7/2008 | Drimusz et al. | 341/176 |
| 2008/0174468 | A1 * | 7/2008 | Drimusz | 341/176 |
| 2008/0220692 | A1 * | 9/2008 | Torres et al. | 446/435 |
| 2008/0280586 | A1 * | 11/2008 | Den Ouden | 455/352 |
| 2009/0002219 | A1 * | 1/2009 | Arling et al. | 341/176 |
| 2009/0153390 | A1 * | 6/2009 | Zackschewski et al. | 341/176 |
| 2009/0185081 | A1 * | 7/2009 | Ueno et al. | 348/734 |
| 2009/0231223 | A1 * | 9/2009 | Laronda | H01Q 7/005 343/748 |
| 2009/0239557 | A1 * | 9/2009 | Kadakia et al. | 455/466 |
| 2010/0029261 | A1 * | 2/2010 | Mikkelsen et al. | 455/419 |
| 2010/0156693 | A1 * | 6/2010 | Ho et al. | 341/176 |
| 2010/0164402 | A1 * | 7/2010 | Nieuwlands | 315/297 |
| 2010/0283917 | A1 * | 11/2010 | Ueno et al. | 348/734 |
| 2011/0007221 | A1 * | 1/2011 | Tomizawa | 348/725 |
| 2011/0037851 | A1 * | 2/2011 | Kim et al. | 348/143 |
| 2011/0090837 | A1 * | 4/2011 | Duchscher et al. | 370/312 |
| 2012/0309495 | A1 * | 12/2012 | Watanabe | 463/20 |

\* cited by examiner

FIG. 3

| | MESSAGE SET | MESSAGE SET CODE/ MESSAGE CODE | COMBINED MESSAGE CODE |
|---|---|---|---|
| SET 1 | 01-http:csl.sec.co.kr/openrc/commontv<br>1- channel Noti<br>2- channel up<br>3- channel down<br>4- volume up<br>5- volume down<br>... | 0001<br>0001/0001<br>0001/0010<br>0001/0011<br>0001/0100<br>0001/0101 | 0001<br>0010<br>0011<br>0100<br>0101 |
| SET 2 | 02-http:csl.sec.co.kr/openrc/webbrowser<br>1- move<br>2- previous<br>3- next<br>... | 0010<br>0010/0001<br>0010/0010<br>0010/0011 | 0110<br>0111<br>1000 |
| SET 3 | 03-http:csl.sec.co.kr/openrc/movieplayer<br>1- play<br>2- stop<br>3- temporarily stop<br>4- rewind<br>... | 0011<br>0011/0001<br>0011/0010<br>0011/0011<br>0011/0100 | 1001<br>1010<br>1011<br>1100 |

FIG. 4

| MESSAGE SET | | MESSAGE SET CODE/<br>MESSAGE CODE | COMBINED<br>MESSAGE CODE |
|---|---|---|---|
| SET 7 | 07-http:csl.sec.co.kr/openrc/commontv<br>  6- channel Not<br>  7- channel up<br>  8- channel down<br>  9- volume up<br>  10- volume down<br>  ... | 0111<br>0111/0001<br>0111/0010<br>0111/0011<br>0111/0100<br>0111/0101 | 0001<br>0010<br>0011<br>0100<br>0101 |
| SET 13 | 13-http:csl.sec.co.kr/openrc/webbrowser<br>  1- move<br>  2- previous<br>  3- next<br>  ... | 1101<br>1101/0001<br>1101/0010<br>1101/0011 | 0110<br>0111<br>1000 |

FIG. 5

| MESSAGE SET | 01 | | | | | 02 | | | 03 | | | |
|---|---|---|---|---|---|---|---|---|---|---|---|---|
| MESSAGE | 1 | 2 | 3 | 4 | 5 | 1 | 2 | 3 | 1 | 2 | 3 | 4 |
| MESSAGE CODE | 1 | 2 | 3 | 4 | 5 | 6 | 7 | 8 | 9 | 10 | 11 | 12 |
| MESSAGE OFFSET | 1~ | | | | | 6~ | | | 9~ | | | |

REMOTE CONTROL APPARATUS AND ELECTRONIC DEVICE REMOTELY CONTROLLED BY THE SAME

CROSS-REFERENCE TO RELATED PATENT APPLICATION

This application claims the benefit of Korean Patent Application No. 10-2011-0007881, filed on Jan. 26, 2011, in the Korean Intellectual Property Office, the disclosure of which is incorporated herein in its entirety by reference.

BACKGROUND

1. Field

Apparatuses and methods consistent with exemplary embodiments relate to remote control apparatuses and electronic devices remotely controlled by the same, and more particularly, to remote control apparatuses capable of minimizing a data transmission amount transmitted and received between a controlled apparatuses and the remote control apparatuses, and electronic devices remotely controlled by the remote control apparatuses.

2. Description of the Related Art

In order for a user to conveniently use a predetermined electronic device, a user may use a remote control apparatus without having to directly manipulate the electronic device. Also, as predetermined electronic device can perform multiple functions, the remote control apparatus can also control multiple operations.

A remote control apparatus and an electronic device controlled by the same receive and transmit a control signal or control data according to a predetermined control protocol. Hereinafter, the electronic device remotely controlled by the remote control apparatus is referred to as a controlled apparatus. Also, data transmitted and received between the remote control apparatus and the controlled apparatus will now be referred to as control data.

Here, a control protocol includes a message which follows a predetermined format. Also, the control protocol differs according to a function to be controlled by the remote control apparatus. Furthermore, different control protocols may be used according to a manufacturing company or model of the controlled apparatus or remote control apparatus, even if the type of the controlled apparatus or remote control apparatus is the same. Accordingly, a predetermined remote control apparatus controls only a predetermined digital television (TV), and is unable to control another digital TV having a control protocol different from the predetermined digital TV.

Therefore, in order to remotely control various controlled apparatuses, a remote control apparatus or remote control method compatible with multiple controlled apparatuses may be provided.

SUMMARY

One or more exemplary embodiments may provide a remote control apparatus having compatibility with a controlled apparatus so as to remotely control various controlled apparatuses.

Exemplary embodiments also provide a remote control apparatus capable of minimizing the amount of data transmitted and received for remote control, and an electronic device remotely controlled by the remote control apparatus.

Exemplary embodiments also provide a remote control apparatus capable of reducing power consumption and manufacturing costs, and an electronic device remotely controlled by the remote control apparatus.

Exemplary embodiments also provide a remote control apparatus capable of controlling a controlled apparatus without a separate agreement or standardization for a control protocol, and an electronic device remotely controlled by the remote control apparatus.

Also according to exemplary embodiments, a remote control apparatus is provided which includes: a storage unit for storing message set information constituting information about one or more message sets each including one or more messages including different control requests; a control unit for generating binary code data each corresponding to the one or more messages each corresponding to the different control requests; and a communication interface unit for transmitting the binary code data to a controlled apparatus.

The one or more message sets may each have an identifying indicator that does not overlap with that of another message set.

The control unit may check whether the controlled apparatus supports the one or more message sets by using the identifying indicator, and when the checking is completed, may start to transmit the binary code data.

The control unit may transmit a list of one or more identifying indicators corresponding to the one or more message sets stored in the storage unit to the controlled apparatus, and the controlled apparatus may select one or more identifying indicators included in the list of one or more identifying indicators.

The identifying indicator may consist of a standardized logical address having exclusiveness.

The one or more message sets may be classified according to control functions, and may each include the one or more messages that perform the same control function.

The one or more message sets may be classified according to at least one control functions from among web browsing, watching control of an image display apparatus, and execution control of a predetermined application.

Upon receiving a predetermined control request, the control unit may generate the binary code data including at least one of a message set code corresponding to one of the one or more message sets, a message code corresponding to a message corresponding to the predetermined control request, and combined message codes individually corresponding to a message corresponding to the predetermined control request regardless of the one ore more message sets.

The control unit may set the binary code data to have a variable data size or a fixed data size.

The storage unit may store at least one of a message set code each corresponding to one of the one or more message sets and a message code each corresponding to the one or more messages, combined message codes individually corresponding to a message corresponding to the predetermined control request regardless of the one or more message sets, and a message offset value each corresponding to the one or more messages.

According to another aspect of exemplary embodiments, there is provided an electronic device remotely controlled by a remote control apparatus, the electronic device including: a storage unit for storing message set information constituting information about one or more message sets each comprising one or more messages comprising different control requests; a communication interface unit for receiving binary code data for requesting to perform a predetermined control operation from the remote control apparatus; and a control unit for controlling the electronic device to perform a predetermined operation according to a message corresponding to the binary code data by using the message set information.

BRIEF DESCRIPTION OF THE DRAWINGS

The above and other features and advantages will become more and readily appreciated from the following description of exemplary embodiments taken in conjunction with the accompanying drawings in which:

FIG. 3 is a table for describing an example of message set information stored in a remote control apparatus;

FIG. 4 is a table for describing an example of message set information stored in a controlled apparatus;

FIG. 5 is a table for describing a message offset value for generating binary code data;

DETAILED DESCRIPTION

Hereinafter, exemplary embodiments will be described more fully with reference to the accompanying drawings.

Figure 1:
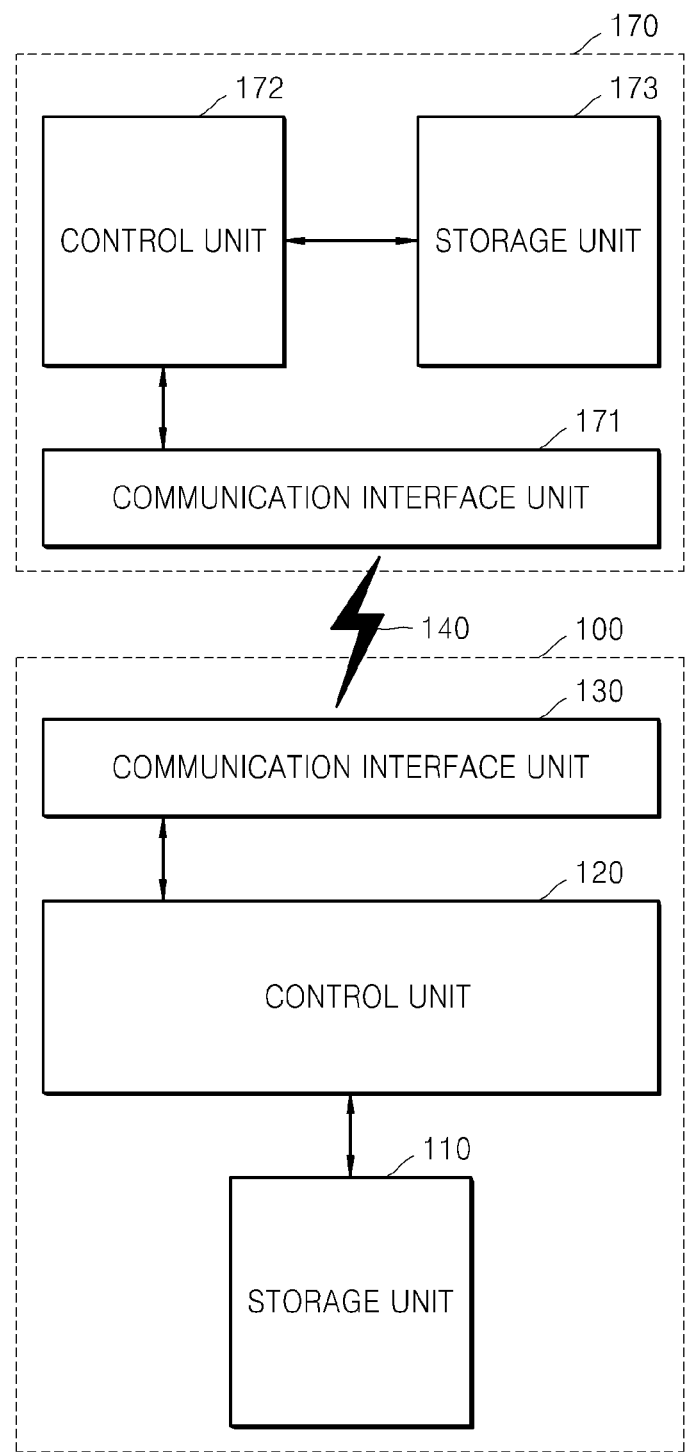
FIG. 1 is a block diagram of a remote control apparatus and a controlled apparatus, according to an exemplary embodiment.

FIG. 1 is a block diagram of a remote control apparatus 100 and a controlled apparatus 170, according to an exemplary embodiment.

Referring to FIG. 1, the remote control apparatus 100 includes a storage unit 110, a control unit 120, and a communication interface unit 130. Also, the controlled apparatus 170 which is controlled by the remote control apparatus 100 includes a communication interface unit 171, a control unit 172, and a storage unit 173.

The remote control apparatus 100 may remotely control the controlled apparatus 170, i.e., a predetermined electronic device. In detail, the remote control apparatus 100 receives a predetermined control request from a user, and generates binary code data constituting control data corresponding to the predetermined control request. According to exemplary embodiments, the binary code data may comprise a binary codeword. The remote control apparatus 100 transmits the binary code data to the controlled apparatus 170 to control the controlled apparatus 170 to perform an operation corresponding to the binary code data.

The storage unit 110 stores information about at least one message set. Hereinafter, the information about the at least one message set stored in the storage unit 110 is referred to as "message set information." Also, each message set includes at least one message including different control requests. The message set information will be described in detail later with reference to FIG. 3.

The control unit 120 generates binary code data corresponding to a message corresponding to a predetermined control request. Here, the predetermined control request may be input by the user. In detail, the control unit 120 may read the message corresponding to the predetermined control request input by the user from the storage unit 110, and generate binary code data corresponding to the read message. Also, the control unit 120 may control the generated binary code data to be transmitted to the controlled apparatus 170.

The communication interface unit 130 transmits the binary code data generated by the control unit 120 to the controlled apparatus 170. In detail, the communication interface unit 130 transmits the binary code data to the communication interface unit 171.

The communication interface unit 130 includes a communication module (not shown) for forming a communication network 140 with the controlled apparatus 170 so as to transmit and receive predetermined data to and from the controlled apparatus 170. For example, the communication interface unit 130 may include at least one of a radio frequency (RF) module for forming the communication network 140 according to an RF communication standard, and an infrared (IR) module for forming a communication network according to an IR communication standard. In detail, the communication interface unit 130 may include a ZigBee communication module, a communication module according to a radio frequency for consumer electronics (RF4CE) standard, or a Bluetooth communication module.

As described above, the controlled apparatus 170 is an electronic device, which is remotely controlled by the remote control apparatus 100 and may have various functions or perform various applications.

Like the storage unit 110 of the remote control apparatus 100, the storage unit 173 of the controlled apparatus 170 stores message set information constituting information about at least one message set, each message set including at least one message including different control requests. The message set information will be described in detail later with reference to FIG. 4.

Like the communication interface unit 130 of the remote control apparatus 100, the communication interface unit 171 of the controlled apparatus 170 transmits and receives predetermined data with the remote control apparatus 100. In detail, the communication interface unit 171 receives binary code data requesting that a predetermined control operation be performed.

Also, like the communication interface unit 130 of the remote control apparatus 100, the communication interface unit 171 of the controlled apparatus 170 may include a communication module (not shown) for forming the communication network 140. For example, the communication interface unit 130 may include at least one of an RF module and an IR module forming a communication network according to an IR communication standard.

The control unit 172 controls the controlled apparatus 170 to perform a predetermined operation according to a message corresponding to the binary code data received through the communication interface unit 171, by using the message set information stored in the storage unit 173. Also, the control unit 172 may generate the binary code data by using the message set information stored in the storage unit 173, and control the communication interface unit 171 to transmit the generated binary code data to the remote control apparatus 100. Here, the remote control apparatus 100 may perform a request or operation corresponding to the received binary code data.

Figure 2:
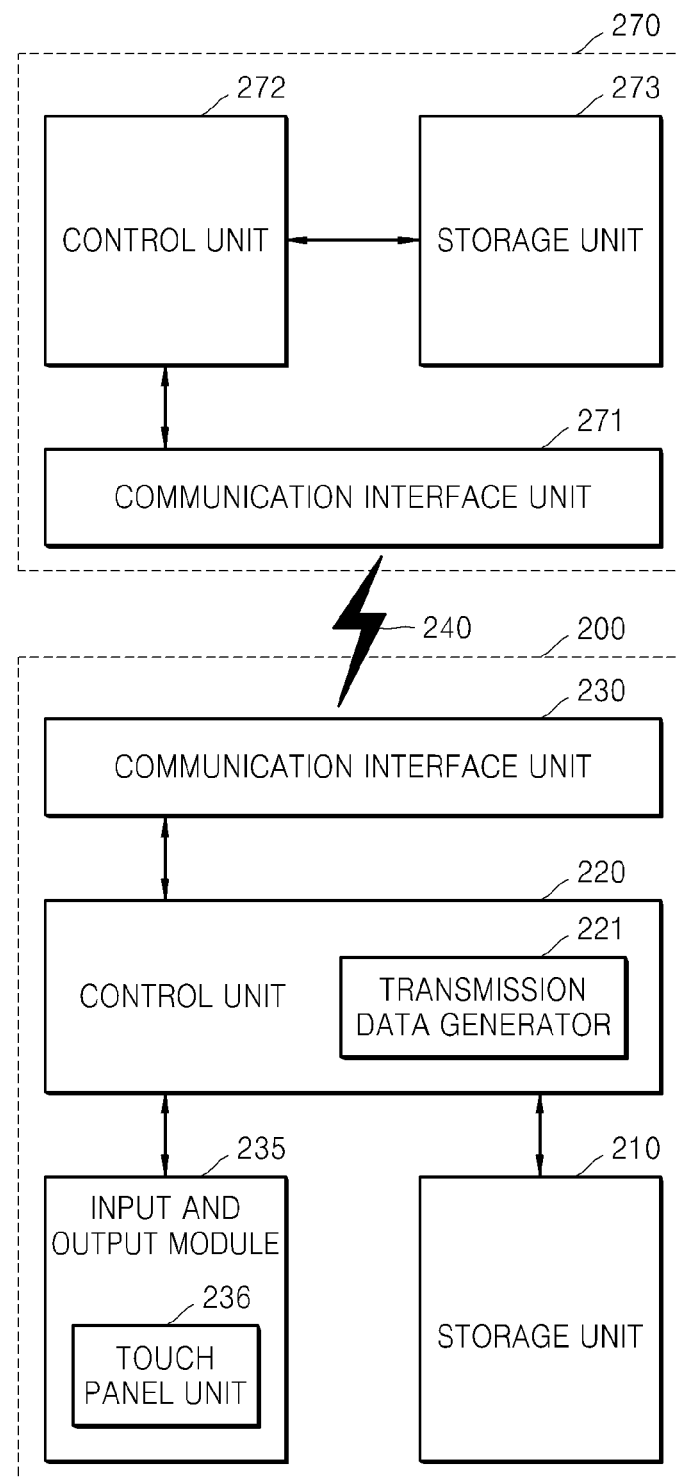
FIG. 2 is a block diagram illustrating in detail the remote control apparatus and the controlled apparatus of FIG. 1.

FIG. 2 is a block diagram illustrating in detail the remote control apparatus 100 and the controlled apparatus 170 of FIG. 1.

A remote control apparatus 200, a storage unit 210, a control unit 220, and a communication interface unit 230 of FIG. 2 respectively correspond to the remote control apparatus 100, the storage unit 110, the control unit 120, and the communication interface unit 130 of FIG. 1. Accordingly, overlapping descriptions thereof will not be repeated herein. Also, since a communication network 240, a controlled apparatus 270, a communication interface unit 271, a control unit 272, and a storage unit 273 of FIG. 2 respectively correspond to the communication network 140, the controlled apparatus 170, the communication interface unit 171, the control unit 172, and the storage unit 173 of FIG. 1, overlapping descriptions thereof will also not be repeated herein.

Referring to FIG. 2, the remote control apparatus 200 may further include an input and output module 235. The input and output module 235 may include a user interface (UI) unit, such as a touch panel unit 236. Further, the control unit 220 may include a transmission data generator 221. In addition, the controlled apparatus 270 may further include the control unit 272 and the storage unit 273.

The input and output module 235 may output interface data visually or auditorily recognizable by a user, and receive predetermined data or a request through the output interface data.

The touch panel unit 236 includes a touch panel (not shown), and thus, when one location on the touch panel is touched, predetermined data or a predetermined request displayed on the touched location is recognized and transmitted to the control unit 172. In detail, the touch panel unit 236 may display user interface data including soft keys constituting a plurality of control keys. The touch panel unit may also recognize a displayed predetermined soft key is touched by the user.

For example, the touch panel unit 236 may output the user interface data including volume adjusting keys, channel changing keys, and a power off key, etc., to control a digital TV showing a general broadcast. In order to adjust the volume, for example, the user may touch a region where the volume adjusting keys are displayed so as to input a volume adjusting request to the remote control apparatus 200.

At least one message set stored in the storage unit 210 may have an identifying indicator that does not overlap with another message set. In other words, the identifying indicator will be unique to a specific message set. Here, the identifying indicator may be formed of at least one of a character, a number, and a symbol that is capable of indicating a message set. For example, the identifying indicator may be a name of a message set indicating a predetermined message set. The message set and messages stored in the storage unit 210 according to exemplary embodiments will now be described in detail with reference to FIG. 3.

FIG. 3 is a table for describing an example of message set information stored in the remote control apparatus 200. In FIG. 3, a plurality of message sets stored in the storage unit 210 are illustrated. Also in FIG. 3, the storage unit 210 stores 3 message sets.

The message sets may be classified according to control functions. The message set may include at least one message performing the same class of control function. The remote control apparatus 200 may perform different control functions according to the type of the controlled apparatus 270 and a function the controlled apparatus 270 is capable of performing.

For example, when the controlled apparatus 270 is a digital TV, the remote control apparatus 200 may perform control functions required to watch the digital TV, for example, the functions necessary to watch a terrestrial or cable broadcast. Also, if the digital TV is able to execute predetermined game programs, the remote control apparatus 200 may perform a control function required to execute the predetermined game.

Accordingly, the message sets stored in the storage unit 210 may be classified according to control functions. For example, the message sets may be classified according to at least one control function from among web browsing, watching control in an image display apparatus (e.g. a digital TV), and execution control of a predetermined application. Here, the predetermined application may be a predetermined game, a moving image player, or the like.

In detail, when the controlled apparatus 270 has a web browsing function, a message set may include messages for controlling the web browsing function. Alternatively, when the controlled apparatus 270 has a TV watching function, a message set may include messages for controlling watching a TV. Alternatively, when the controlled apparatus 270 includes a moving image player, a message set may include messages for controlling the moving image player.

Also, referring to FIG. 3, an identifying indicator of a message set may be formed of a standardized logical address which is exclusive to that message set. In detail, the identifying indicator may be formed of a uniform resource locator (URL). In other words, the identifying indicator may be formed of a text, or a combination of a hierarchical domain name and a predetermined path designated by the hierarchical domain name.

Uniform resource locators are unique if they come from different sources and are exclusively used. Accordingly, when an URL is used as the identifying indicator indicating the message set and binary code data including data corresponding to the identifying indicator is transmitted to the controlled apparatus 270, the exclusiveness of control data can transmitted by the remote control apparatus 200 may be obtained without having to standardize a control protocol of the remote control apparatus 200. Accordingly, the remote control apparatus 200 may be used without overlap with another remote control apparatus or a control protocol since the identifying indicator is unique, and data corresponding to the identifying indicator is also unique.

In FIG. 3, the URL is used as the identifying indicator, but any other unique indicator that does not overlap with other message sets may be used.

Referring to FIG. 3, the message set for controlling watching a TV, the message set for controlling the web browsing function, and the message set for controlling the moving image player are respectively referred to as a set 1, a set 2, and a set 3. Also, identifying indicators of the sets 1 through 3 are respectively http://csl.sec.co.kr/openrc/commontv, http://csl.sec.co.kr/openrc/webbrowser, and http://csl.sec.co.kr/openrc/movieplayer.

When a URL is used as the identifying indicator of the message set, a manufacturer or user of the remote control apparatus 200 for providing the message set may obtain a predetermined URL and add an independent indicator indicating a predetermined control function as a lower path of the obtained predetermined URL, thereby generating the identifying indicator of the message set. For example, the manufacturer or user of the remote control apparatus 200 may obtain a URL of http://csl.sec.co.kr and add an indicator of /openrc/commontv constituting an indicator indicating a predetermined control function, so that the set 1 has an identifying indicator such as 'http://csl.sec.co.kr/openrc/commontv'.

Each message set includes at least one message performing the same class of predetermined control functions. For example, the set 1 constituting the message set for controlling watching a TV may include a channel list notification request message (1-channel Noti), a channel increase request message (2-channel up), a channel decrease request message (3-channel down), a volume increase request message (4-volume up), and a volume decrease request message (5-volume down).

Alternatively, the set 2 constituting the message set for controlling the web browsing function may include a movement request message (1-move to) to a predetermined location, a movement request message (2-previous) to a previous page, and a movement request message (3-next) to a next page.

Also, each message set includes a corresponding message set code, and each of the messages included in the message set may include a message code. Here, the message set codes may have different values according to a message set and according to an order of the message sets stored in the storage unit 210. Also, even if the message sets are the same according to the remote control apparatus 200, different values may be provided to the message sets according to a stored order.

Alternatively, a combined message code may be independently assigned to each message stored in the storage unit 210, without also assigning a message set code and a message code. The combined message code may be assigned to each message stored in the storage unit 210 as an independent code regardless of a message set.

In FIG. 3, the message set codes, the message codes, and the combined message codes are each formed of binary data of 4 bits. In other words, each of the message set codes, the message codes, and combined message codes are assigned a 4-bit codeword.

The message set information described in FIG. 3 may be stored in the storage unit 210 by the manufacturer or the user of the remote control apparatus 200. Also, when a change is made to a control function the remote control apparatus 200 is able to perform, the manufacturer or user of the remote control apparatus 200 may update the message set information through a predetermined server. Then, the remote control apparatus 200 may download and store the updated message set information in the storage unit 210.

Also, the message set information may be stored in the storage unit 273 of the controlled apparatus 270. The message set information stored in the controlled apparatus 270 will now be described in detail with reference to FIG. 4.

FIG. 4 is a table for describing an example of message set information stored in the controlled apparatus 270.

Referring to FIG. 4, the storage unit 273 of the controlled apparatus 270 may store the message set information similar to the message set information described with reference to FIG. 3. However, since values of a message set code and combined message code may differ according to a stored order of a message set, the message set codes or combined message codes may have different values than they do in FIG. 3. Whether message sets are the same or not may be determined by an identifying indicator of the message sets. Accordingly, the message set code stored in the storage unit 273 may be different from the message set code stored in the remote control apparatus 200, and the combined message code stored in the storage unit 273 may also be different from the combined message code stored in the remote control apparatus 200.

In FIG. 4, two message sets, which are a set 7 constituting a message set for controlling watching a TV and a set 13 constituting a message set for controlling a web browsing function, are stored in the controlled apparatus 270. As described above, since message set codes may differ according to the stored order of the message sets, a message set 'http://csl.sec.co.kr/openrc/commontv' may have a message set code of 0001 in FIG. 3 and a message set code of 0111 in FIG. 4.

Also, like the message set information stored in the storage unit 210 of the remote control apparatus 200, the message set information stored in the controlled apparatus 270 may be stored in the storage unit 273 by the manufacturer, user of the remote control apparatus 200, or a manufacturer or user of the controlled apparatus 270.

Also, when a change is made to the functions the controlled apparatus 270 is able to perform (e.g. a function is changed or added), the manufacturer or user of the remote control apparatus 200 or controlled apparatus 270 may update the message set information through a predetermined server, and the controlled apparatus 270 may download and store the updated message set information in the storage unit 273.

Also, according to exemplary embodiments, the corresponding message sets in the remote control apparatus and the controlled apparatus include the same messages, and corresponding messages from the same message set are assigned the same message codes. In detail, the same messages may include the same message code, regardless of a device storing the message set. For example, the message '2-channel up' in FIG. 3 includes a message code of 0010 in FIG. 3 and the message '2-channel up' in FIG. 4 also includes a message code of 0010. For example, the set 1 of FIG. 3 has the same messages and message codes as the set 7 of FIG. 4.

FIG. 5 is a table for describing a message offset value for generating binary code data. In FIG. 5, a decimal number is shown for convenience of description.

The message set information described in FIG. 3 or 4 may further include a message offset value. The message offset value is a value corresponding to and designating a predetermined message set or predetermined message. Referring to FIG. 5, a smallest value from among values of the message codes included in the messages may be provided to one message set as an offset value. Also, since continuous message offset values are provided to messages included in the message set according to a defined order, a corresponding message may be determined when a message offset value is known. For example, a second message included in a set 2 (message set 02) is stored seventh in a database of FIG. 5. Accordingly, when a message offset value is 7, a message is the second message in the set 2.

Operations of the exemplary remote control apparatuses 100 and 200 will now be described with reference to FIGS. 6 through 8. Since a remote control apparatus 600 and a controlled apparatus 670 of FIG. 6 respectively correspond to the remote control apparatuses 100 and 200, and the controlled apparatuses 170 and 270 of FIGS. 1 and 2, overlapping descriptions thereof will not be repeated herein. Also, internal structures of the remote control apparatus 600 and the controlled apparatus 670 have been described above with reference to FIG. 2.

Figure 6:
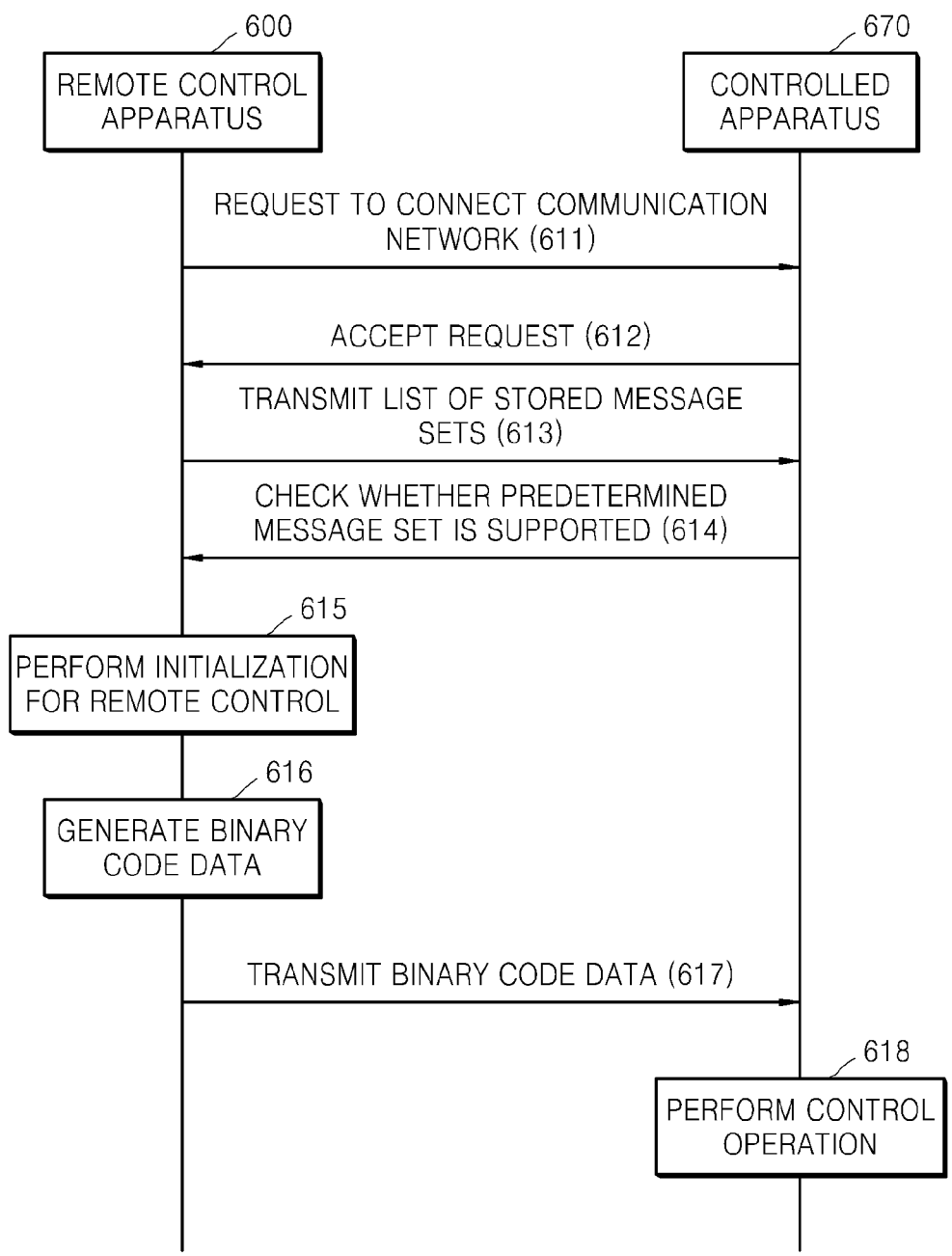
FIG. 6 is a diagram for describing operations of a remote control apparatus, according to an exemplary embodiment.

Referring to FIG. 6, in operation 611 the remote control apparatus 600 requests to connect a communication network to the controlled apparatus 670 through the communication interface unit 130 included in the remote control apparatus 600. In detail, the control unit 220 of the remote control apparatus 600 searches for electronic devices for forming a communication network through the communication module included in the communication interface unit 230. Then, the control unit 220 selects at least one of the found electronic devices, and requests to connect and set a communication network to the selected at least one electronic device. Here, the selected at least one electronic device is the controlled apparatus 670.

In operation 612, and in response to the request made in operation 611, the control unit 272 of the controlled apparatus 670 transmits a message accepting the request to the communication interface unit 230 of the remote control apparatus 600 through the communication interface unit 271.

For example, when the communication interface unit 230 of the remote control apparatus 600 includes a Bluetooth communication module (not shown), the remote control apparatus 600 connects and creates a wireless communication network with the controlled apparatus 670 according to an initial one time Bluetooth request. Accordingly, the remote control apparatus 600 may transmit and receive predetermined data to and from the controlled apparatus 670 according to a Bluetooth communication standard, without a separate, additional settings in the following operations.

The control unit 220 of the remote control apparatus 600 may check whether the controlled apparatus 670 supports message sets stored in the remote control apparatus 600, by using a list of identifying indicators of the message sets, i.e., a list of message sets. If it is determined that the controlled apparatus 670 supports the message sets, the control unit 220 starts to transmit binary code data for remote control.

In operation 613, when the remote control apparatus 600 and the controlled apparatus 670 are connected to each other via the communication network, the control unit 220 of the remote control apparatus 600 may transmit the list of message sets stored in the storage unit 210 to the controlled apparatus 670. Operations 613 and 614 will now be described with reference to FIG. 7.

Figure 7:
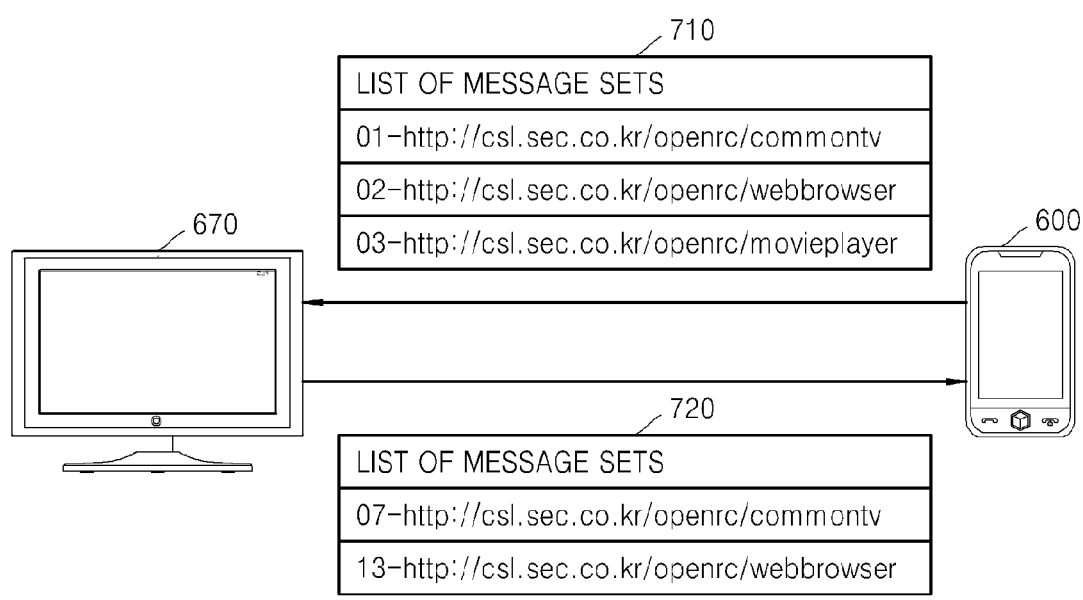
FIG. 7 is a diagram for describing operations 613 and 614 of FIG. 6.

FIG. 7 is a diagram for describing operations 613 and 614 of FIG. 6.

Referring to FIG. 7, the list of message sets transmitted in operation 613 is a list of identifying indicators of the message sets. The remote control apparatus 600 transmits a list 710 of identifying indicators of the message sets, i.e., the list of message sets, to the controlled apparatus 670.

The control unit 272 of the controlled apparatus 670 checks whether a predetermined message set included in the list of message sets received in operation 613 is supported to the remote control apparatus 600, and transmits a response in operation 614. In detail, the control unit 272 detects identifying indicators of message sets from among the identifying indicators of message sets stored in the storage unit 273, which are identical to the identifying indicators of the message sets received in operation 613. Then, the control unit 272 transmits a list 720 of the detected identifying indicators to the remote control apparatus 600. Alternatively, the control unit 272 may transmit the list of the identifying indicators of the message sets stored in the storage unit 273 to the remote control apparatus 600. In this case, the remote control apparatus 600 compares the received list 720 with the list 710 stored in the storage unit 210.

The control unit 220 of the remote control apparatus 600 may receive the list 720 of the identifying indicators detected in operation 614, and may select at least one identifying indicator included in the list 720 from the list 710 of the identifying indicators received in operation 613. Then, the remote control apparatus 600 performs remote control by using at least one message set corresponding to the selected at least one identifying indicator.

Also, when it is checked is a message set is supported in operation 614, the control unit 220 performs initialization for remote control in operation 615. Specifically, the message sets stored in the remote control apparatus 600 and the message sets stored in the controlled apparatus 670 are mutually matched to each other. Alternatively, each message stored in the remote control apparatus 600 may be matched with the messages stored in the controlled apparatus 670.

For example, codes of message sets having the same identifying indicator of "http://csl.sec.co.kr/openrc/commontv" are matched to each other. In other words, since the identifying indicators of the set 1 in FIG. 3, and the identifying indicators of set 7 in FIG. are identical, the message set code 0001 of the set 1 and the message set code 0007 of the set 7 are matched with each other.

The control unit 220 may store matching information obtained in operation 615 in the storage unit 210. The matching information may be used to generate binary code data for transmission. For example, when the remote control apparatus 600 transmits the message '2-channel up' included in the set 1, the corresponding message set code 0111 of the set 7 is included in and transmitted with binary code data, instead of the message set code 0001 of the set 1, so that the controlled apparatus 670 easily interprets the binary code data.

In FIG. 6, the control unit 220 of the remote control apparatus 200 performs the initialization in operation 615, but alternatively, operation 615 may be performed by the control unit 272 of the controlled apparatus 670. If the controlled apparatus 670 performs operation 615, the control unit 272 may immediately recognize a corresponding message, even if binary code data that does not reflect the matching information is received.

In operation 616, the control unit 220 receives a predetermined control request, and generates binary code data to be transmitted to the controlled apparatus 270 corresponding to and in response to the predetermined control request. Accordingly to exemplary embodiments, operation 616 may be performed by the transmission data generator 221.

In detail, the transmission data generator 221 reads at least one of a message set, a message code, and a combined message code, which corresponds to the predetermined control request, from the storage unit 210, and generates the binary code data to be transmitted to the controlled apparatus 670. Also, the transmission data generator 221 further reads a message offset value to generate the binary code data. The binary code data generated in operation 616 will now be described in detail with reference to FIG. 8.

Figure 8A:
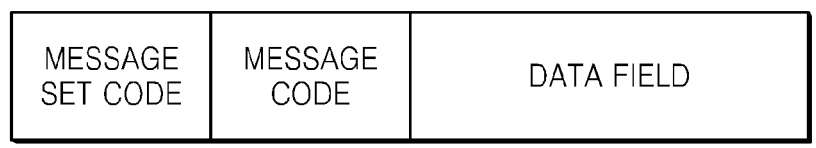
FIGS. 8A through 8C are diagrams for describing binary code data transmitted by a remote control apparatus.
Figure 8B:
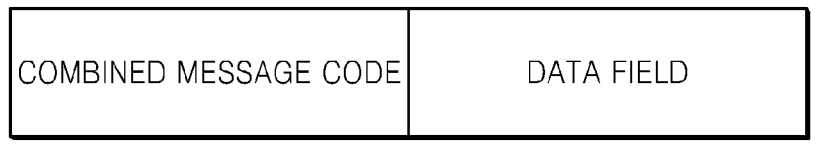
Figure 8C:

FIGS. 8A through 8C are diagrams for describing binary code data transmitted by the remote control apparatus 600.

Referring to FIG. 8A, the binary code data may be formed of a combination of a message set code and a message code. Also, the binary code data may further include a data field for transmitting additional data.

Referring to FIGS. 3 and 4, if the user wants to increase a volume of a digital TV, i.e., the controlled apparatus 670, the user inputs a request of "increase volume one time" to the remote control apparatus 600. Here, the request of "increase volume" by be input through the touch panel unit 236 of the input and output module 235. Then, the transmission data generator 221 reads a message set code and a message code corresponding to the request of "increase volume" from the storage unit 210. In detail, the transmission data generator 221 reads the message set code 0001 of the set 1 constituting a message set corresponding to the request of "increase volume", and the message code 0100 corresponding to '4-volume up' constituting a message requesting to increase a volume.

Then, binary code data 00010100 formed of the message set code and the message code is generated by using the read message set code and message code. Matching information that the message set code 0001 of the set 1 stored in the storage unit 210 and the message set code 0111 of the set 7 stored in the storage unit 273 match each other may be included in the data field. Here, the matching information may be obtained in operation 615 described above and stored in the storage unit 210 or the storage unit 273.

Alternatively, if the message set code for the corresponding message set stored on the controlled apparatus is to be sent, the control unit 220 may convert the message set code 0001 to the matched message set code 0111 of set 7, and generate binary code data 01110100 formed of the message set code and the message code.

Also, the control unit 220 may set the binary code data to have a variable or fixed data size. If the binary code data has a variable data size, the binary code data may be designed to have a minimum data size by considering data sizes of the message set code and message code. For example, when the message set code and the message code are respectively 4 bits, the binary code data may be designed to have 8 bits.

Alternatively, if the binary code data has a fixed data size, the control unit 220 may assign predetermined data sizes respectively to a message set code region and a message code region in the binary code data. For example, 4 bytes may be assigned to the message set code region and 4 bytes may be assigned to the message code region so that the binary code data has a size of 8 bytes. Alternatively, 4 bytes may be further assigned to a data field region so that the binary code data has a total size of 12 bytes.

Referring to FIG. 8B, the binary code data may comprise a combined message code. Also, like FIG. 8A, the binary code data may further include a data field for transmitting additional data.

As described above, when the user inputs the request of "increase volume" to the remote control apparatus 600, the control unit 220 reads a combined message code 0100 corresponding to the request from message set information stored in the storage unit 210. Then, the control unit 220 may generate a matched combined message code as the binary code data by using matching information that a combined message code 0100 stored in the storage unit 210 matches a combined message code 0100 stored in the storage unit 273.

Here, the matched combined message code is a combined message code stored in the storage unit 273, which corresponds to a predetermined combined message code stored in the storage unit 210. Also, a combined message code before matching is the predetermined combined message code itself stored in the storage unit 210.

The control unit 220 may include the combined message code of 0100 before matching in a combined message code region, and add matching information that the combined message code 0100 stored in the storage unit 210 matches the combined message code 0100 stored in the storage unit 273 to a data field region.

Referring to FIG. 8C, the binary code data may include a message offset code. Also, like FIG. 8A, the binary code data may further include a data field for transmitting additional data.

Referring to FIG. 5, message offset values are given in an order stored in the storage unit 210, and a message code and a message offset value have the same value. When a message corresponding to a message code 11 is transmitted to the controlled apparatus 270, the control unit 220 detects a message offset value 11 corresponding to the message code 11. Since a binary number of the message offset value 11 is 1011, 1011 is included in a message offset code region to generate the binary code data. Also, the matching information described above may be included in the data field.

The control unit 220 transmits the binary code data generated in operation 615 to the controlled apparatus 670 in operation 617. In detail, the control unit 220 may transmit the binary code data to the communication interface unit 271 of the controlled apparatus 670 through the communication interface unit 230.

Upon receiving the binary code data transmitted in operation 617, the control unit 272 of the controlled apparatus 670 performs a request or command corresponding to the received binary code data in operation 618. In detail, the controlled apparatus 670 detects a message corresponding to the binary code data, and performs an operation indicated by the detected message, by using the message set information stored in the storage unit 273. Also, if the matching information is not included in the binary code data and is obtained as the control unit 272 performs operation 615, the control unit 272 may detect the message corresponding to the binary code data by using the message set information and the matching information stored in the storage unit 273.

As described with reference to FIG. 8B, if the matched combined message code is 0100, the control unit 272 detects a corresponding message '9-volume up' from the storage unit 273, and performs an operation of "increase volume", i.e., the operation indicated by the detected message.

Also, like operations 616 and 617, the control unit 272 of the controlled apparatus 670 generates binary code data and transmits the binary code data to the remote control apparatus 600 (operation not shown). Then, like operation 618, the remote control apparatus 600 may perform a request or command corresponding to the received binary code data (operation not shown).

In FIGS. 1 through 8, one remote control apparatus remotely controls one controlled apparatus, but a remote control apparatus according to an exemplary embodiment is capable of performing a communication network connection and initialization described in operations 611 through 615 of FIG. 6 with a plurality of controlled apparatuses, and thus, is capable of controlling the plurality of controlled apparatuses. For example, the remote control apparatus may store message sets for controlling each controlled apparatus in the storage unit 210, and transmit binary code data generated by using the message sets to each controlled apparatus.

Also, upon generating identifying indicators of the message sets, a user or the like of the remote control apparatus opens information about the message sets to the public so that a user or manufacturer of a controlled apparatus controlled by the remote control apparatus may generate and develop additional message set information.

As described above, since the remote control apparatus uses the identifying indicators of the message sets, which are unique, the remote control apparatus may be used without overlapping with another remote control apparatus or control protocol.

An example of a method of transmitting data by using a conventional remote control apparatus includes a remote user interface (RUI) method. In the RUI method, a remote control apparatus displays a web page for control on a screen of a controlled apparatus, and performs remote control when a user manipulates the displayed web page. Since the RUI method generally uses a text-based hyper text transfer protocol (HTTP) while transmitting and receiving data, a bandwidth of a communication network for transmitting and receiving data is large. Accordingly, a communication module having a low price or low power consumption cannot be used.

Another example of the method includes a simple object access protocol (SOAP) method. SOAP is a control protocol employed by universal plug and play (UPnP), and prepares and relays a control message and a response to the control message in extensible markup language (XML). When data prepared in XML is transmitted and received, a large amount of data is required just to transmit a simple control message. Accordingly, a data transmission amount increases, and thus, a bandwidth of a communication module also increases. Further, as the size of control data increases, the time required to generate and process the control data also increases.

However, since exemplary embodiments of a remote control apparatus and an electronic device remotely controlled by the remote control apparatus, according to transmit and receive control data therebetween by using binary code data, the size of the date transmitted and received between the remote control apparatus and the controlled apparatus may be reduced.

Also, since the size of the control data is reduced, a communication module having a low price or low power consumption and a small communication bandwidth, such as a ZigBee communication module may be used. Accordingly, power consumption and manufacturing costs of the remote control apparatus may be reduced. Also, since the time required to generate and process a control message is reduced, control operation process speeds of the remote control apparatus and the controlled apparatus may be increased.

In addition, when a function to be controlled is added, only a message set corresponding to the function is additionally generated and stored in the remote control apparatus and the controlled apparatus, and thus, the remote control apparatus and the controlled apparatus may fluidly adapt to changes in control functions.

While the present exemplary embodiments been particularly shown and described it will be understood by those of ordinary skill in the art that various changes in form and details may be made therein without departing from the spirit and scope of the present invention as defined by the following claims.

What is claimed is:

1. A remote control apparatus configured to control an image display device, the remote control apparatus comprising:
   a storage unit configured to store message set information, the message set information comprising information about a plurality of message sets classified according to a class of control functions, wherein each of the plurality of message sets comprises at least one message that corresponds to a control request to perform a function on the image display device and performs the same class of the control functions;
   a control unit configured to generate binary code data corresponding to the at least one message in the message set; and
   a communication interface unit configured to transmit the binary code data to the image display device,
   wherein information corresponding to each of the plurality of message sets included in the message set information comprises:
      a message set comprising the at least one message; and
      an identifying indicator of the message set that exclusively corresponds to the class of the control functions and does not overlap with an identifying indicator of another message set, and
   wherein the control unit is further configured to:
      control the communication interface unit to transmit a list of one or more identifying indicators corresponding to one or more message sets of the plurality of message sets stored in the storage unit to the image display device,
      control the communication interface unit to receive selected one or more identifying indicators included in the list from the image display device, and
      generate the binary code data corresponding to one or more message sets corresponding to the selected one or more identifying indicators.

2. The remote control apparatus of claim 1, wherein the identifying indicator comprises a unique standardized logical address.

3. The remote control apparatus of claim 1 wherein the message set is classified according to at least one class of control functions from among web browsing, watching control of the image display apparatus, and execution control of a predetermined application.

4. The remote control apparatus of claim 1, wherein the control unit is further configured to generate the binary code data upon receiving a predetermined control request, and
   wherein the binary code data comprises at least one of a following:
      a message set code corresponding to the message set,
      a message code corresponding to the at least one message corresponding to the predetermined control request, and
      a combined message code corresponding to a message corresponding to the predetermined control request regardless of the message set.

5. The remote control apparatus of claim 1, wherein the control unit is further configured to set the binary code data to have a variable data size or a fixed data size.

6. The remote control apparatus of claim 1, wherein the storage unit stores at least one of a following:
   a message set code corresponding to the message set and a message code corresponding to the at least one message,
   a combined message code corresponding to the at least one message regardless of the message set, and
   a message offset value corresponding to the at least one message.

7. The remote control apparatus according to claim 1, wherein the identifying indicator is a uniform resource locator (URL).

8. The remote control apparatus according to claim 1, wherein each of the message sets perform a plurality of functions different from the functions of other message sets.

9. The remote control apparatus according to claim 1, wherein the plurality of message sets are sorted by at least one of a type of the image display device and a function of the image display device.

10. An image display device configured to be remotely controlled by a remote control apparatus, the image display device comprising:
   a storage unit configured to store message set information, the message set information comprising information about a message set classified according to a class of control functions the image display device is configured to perform, the message set comprising at least one message that corresponds to a control request to perform a function on the image display device and performs the same class of control functions;
   a communication interface unit configured to receive binary code data from the remote control apparatus, the binary code data comprising a request to perform a predetermined control operation; and
   a control unit configured to control the image display device to perform a predetermined operation according to the at least one message corresponding to the binary code data by using the message set information,
   wherein information corresponding to each of the plurality of message sets included in the message set information comprises:
      a message set comprising the at least one message; and an identifying indicator of the message set that exclusively corresponds to the class of control functions and does not overlap with an identifying indicator of another message set, and wherein the control unit is further configured to:
control the communication interface unit to receive a list of one or more identifying indicators of one or more message sets of the plurality of message sets stored in the remote control apparatus from the remote control apparatus,
check whether the storage unit stores at least one of the one or more message sets included of the one or more identifying indicators in the list, and
control the communication interface unit to transmit a result of the checking to the remote control apparatus.

11. The image display device of claim 10, wherein the identifying indicator comprises a unique standardized logical address.

12. The image display device of claim 10, wherein the binary data code comprises at least one of:
a message set code corresponding to the message set,
a message code corresponding to the at least one message corresponding to a predetermined control request,
and a combined message code individually corresponding to a message, wherein the message corresponds to the predetermined control request regardless of the message set.

13. A system comprising:
a remote control,
an image display device, and
a communication network;
wherein the remote control is configured to:
store message set information comprising information about a plurality of message sets; and
transmit a list of one or more unique identifiers corresponding to one or more predetermined message sets from among the plurality of message sets to the image display device across the communication network,
wherein the one or more predetermined message sets comprises at least one message set classified according to a class of control functions,
wherein the at least one message set comprises at least one message that corresponds to a control request to perform a function on the image display device and performs the same class of control functions,
wherein the image display device is configured to:
check in a checking whether the at least one message set is supported by the image display device by comparing the sent one or more unique identifiers with a stored unique identifier stored at the image display device, and
send, in response to the checking, at least one unique identifier corresponding to at least one message set supported by the image display device to the remote control, and
wherein information corresponding to each of the plurality of message sets included in the message set information comprises:
a message set comprising the at least one message; and
unique identifier of the message set that exclusively corresponds to the class of control functions and does not overlap with a unique identifier of another message set and is exclusively used.

14. The system according to claim 13, wherein the remote control is further configured to control the image display device using the at least one message set corresponding to the at least one unique identifier sent by the image display device.

15. The system according to claim 13, wherein the remote control is further configured to:
generate code data corresponding to the at least one message set supported by the image display device corresponding to the at least one unique identifier sent by the image display device, and
transmit the generated code data to the image display device.

16. The system according to claim 15, wherein the image display device is further configured to perform a predetermined operation according to the at least one message corresponding to the code data by using the message set information.

* * * * *